W. I. KENISON.
GANG PLOW.
APPLICATION FILED NOV. 3, 1915.

1,186,515.

Patented June 6, 1916.
2 SHEETS—SHEET 1.

Witnesses
B. J. Brann
Henry T. Bright

Inventor
W. I. Kenison

By
Attorneys

W. I. KENISON.
GANG PLOW.
APPLICATION FILED NOV. 3, 1915.
1,186,515.
Patented June 6, 1916.
2 SHEETS—SHEET 2.
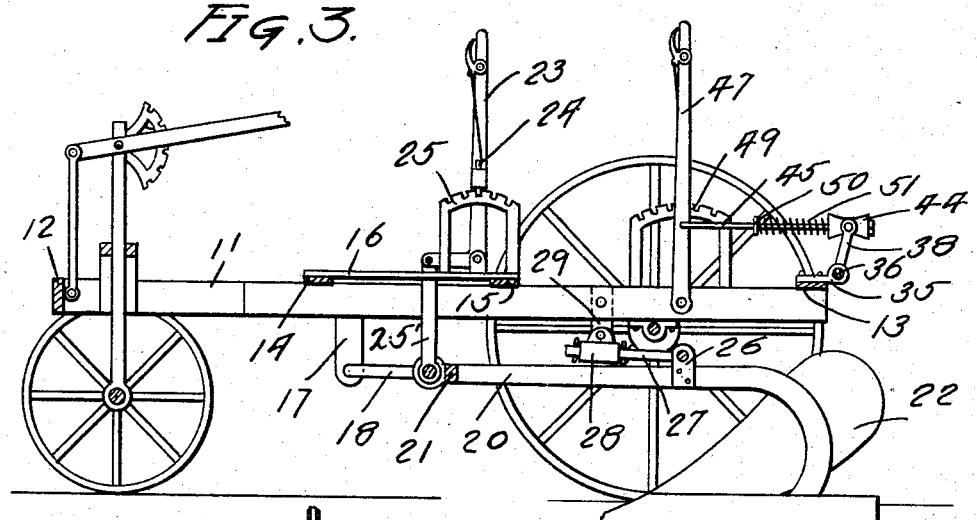
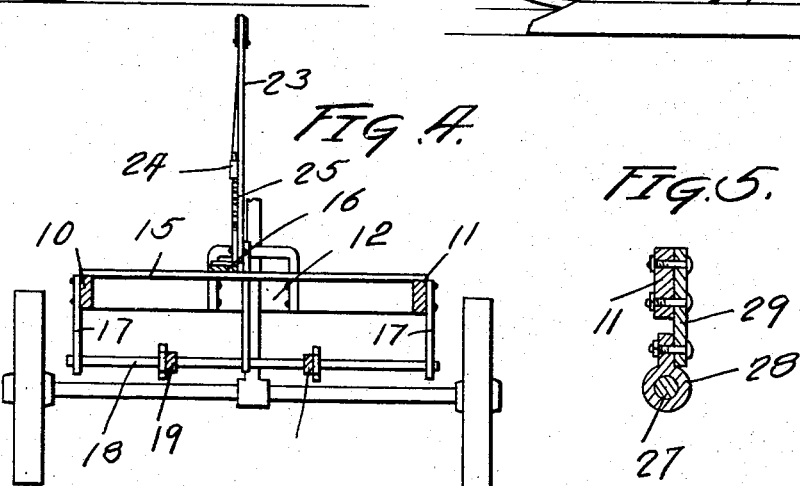
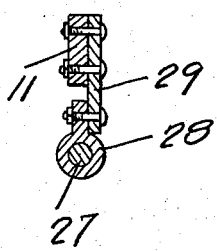
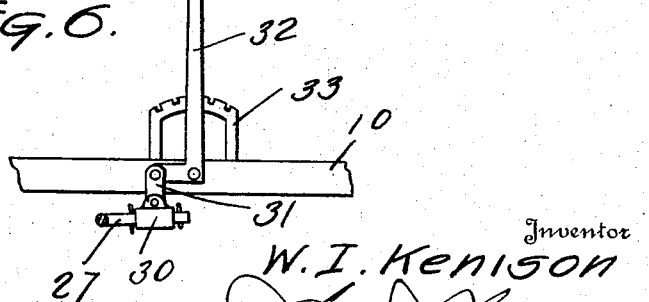
Inventor
W. I. Kenison

UNITED STATES PATENT OFFICE.

WILLIAM I. KENISON, OF NILES, KANSAS, ASSIGNOR OF ONE-HALF TO LEWIS B. NICKELS, MILTON C. PAYNE, AND EMMET O. NEELY, ALL OF NILES, KANSAS.

GANG-PLOW.

1,186,515.  Specification of Letters Patent.  Patented June 6, 1916.

Application filed November 3, 1915. Serial No. 59,445.

*To all whom it may concern:*

Be it known that I, WILLIAM I. KENISON, a citizen of the United States, residing at Niles, in the county of Ottawa, State of Kansas, have invented certain new and useful Improvements in Gang-Plows; and I do hereby declare the following to be a full, clear, and exact description of the invention, such as will enable others skilled in the art to which it appertains to make and use the same.

This invention relates to gang plows.

The object of the invention is to provide a gang plow embodying an improved construction for effecting the adjustment of the plow elements to regulate the depth of the furrow and the angle or pitch at which the plow point enters the ground, the invention being particularly an improvement over the structure disclosed in United States Patent No. 1,152,369, granted to myself and Jesse A. Neely, August 31, 1915.

It is also the object of my invention to provide an improved structure which will prevent the weight of the tractor being carried on the plows when the tractor is passing over uneven ground.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1:
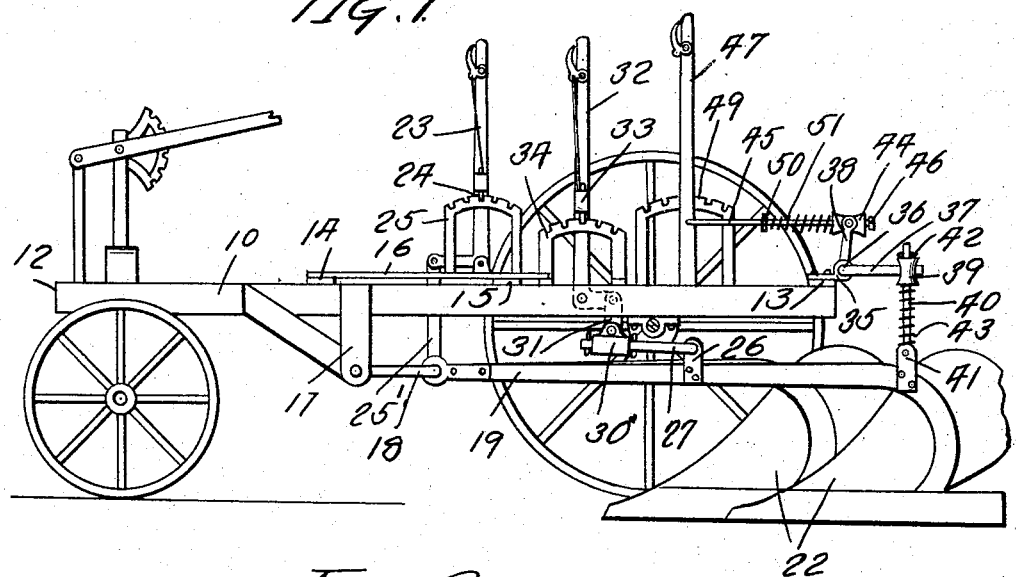
Figure 2:
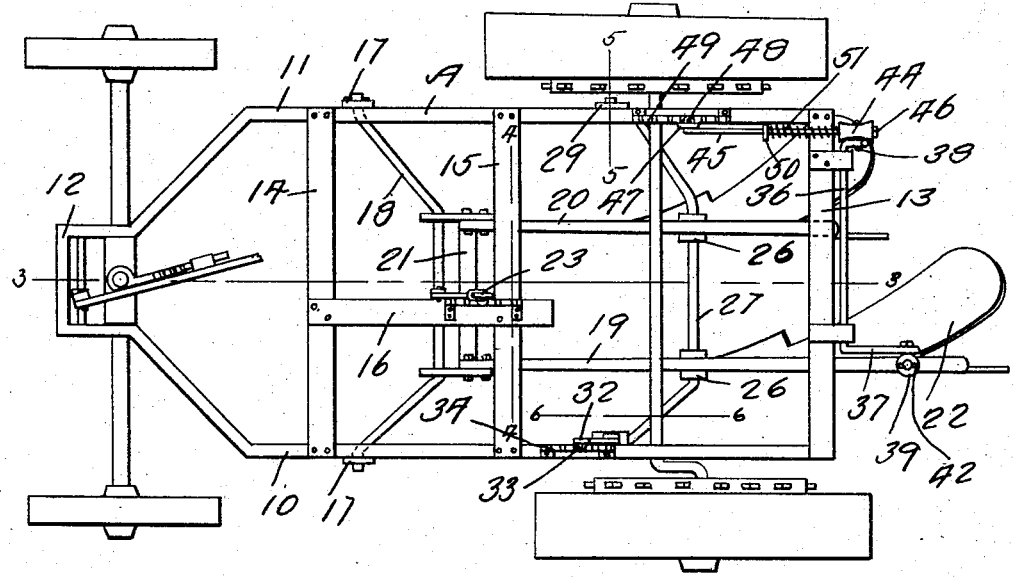

Figure 1 is a side elevation of a motor plow embodying the invention, the propelling mechanism for the plow being omitted for the sake of clearness; Fig. 2, a plan view of what is shown in Fig. 1; Fig. 3, a section on the line 3—3 of Fig. 2; Fig. 4, a section on the line 4—4 of Fig. 2; Fig. 5, a section on the line 5—5 of Fig. 2, and Fig. 6, a section on the line 6—6 of Fig. 2.

Referring to the drawings A indicates the wheel frame of the tractor which includes side members 10 and 11, a front member 12, a rear member 13, cross members 14 and 15 and a longitudinal member 16 connecting said cross members. Depending from the side members 10 and 11 are brackets 17 in which are rotatably mounted the ends of a bail 18. Pivotally mounted or connected to the bail 18 are the forward ends of plow beams 19 and 20 and said beams are connected to each other by a bar 21. These beams carry at their rear ends respectively the usual plows 22. Pivotally mounted on the longitudinal member 16 is an angle lever 23 which carries a spring pawl 24 which coöperates with a segment 25 mounted on the member 16. One end of the angle lever 23 is connected to the bail 18 by means of a link 25'. By operating the lever 23 it will be obvious that the forward ends of the plow beams can be raised and lowered for the purpose of regulating the depth of the cut. Mounted on the beams 19 and 20 adjacent their rear ends are brackets 26 in which is rotatably mounted a bail 27. One end of this bail 27 is slidably engaged in a sleeve 28 pivotally mounted on a bracket 29 depending from the side member 11. The other end of the bail 27 is slidably engaged in a sleeve 30 which is pivotally connected to one end of a link 31. The other end of this link is in turn pivotally connected to one end of an angle lever 32 which latter is pivoted on the side member 10. This lever 32 also carries a spring pawl 33 which coöperates with a toothed segment 34 mounted on the member 10 for the purpose of securing the lever in a desired adjustment.

By operating the lever 32 the structure just described will serve to bring the plows to a level when the tractor wheel is in the furrow and at the same time secure the plows against sidewise movement. Rotatably mounted in bearings 35 on the rear member 13 is a shaft 36 the ends of which are provided respectively with crank arms 37 and 38. Pivotally connected to the free end of the crank arm 37 is a sleeve 39 in which is slidable a rod 40 having one end pivotally connected to a bracket 41 secured to the beam 19. The sleeve 39 is held against disengagement from the rod 40 by a cotter pin 42. Encircling the rod 40 is a spring 43 one end of which bears against the sleeve 39 while the other end bears against the bracket 41. Pivotally mounted on the free end of the arm 38 is a sleeve 44 in which is slidably mounted a rod 45 provided at one end with a head 46 to prevent disengagement of the sleeve from the rod. The other end of this rod 45 is pivotally connected to a lever 47 mounted upon the side member 11 and carrying a spring pawl 48 which coöperates with a segment 49 for the purpose of holding the lever in a desired adjustment. The rod 45 is provided with a suitable stop 50 and a spring 51 encircles said rod and has one end bearing against the stop 50 and its other end against the sleeve 44. By providing the springs 43 and 51 the plows are yieldingly held against upward movement at their rear ends, said springs of course exerting a predetermined downward pressure on the plows. By this construction it will be obvious that should the tractor vary in position up or down as would occur in travel over uneven ground the strain will be exerted on the springs and relieve the plows of the weight of the tractor and therefore reduce the traction.

While one particular form of carrying the invention into practice has been illustrated and described it will be obvious that various changes can be resorted to in the details of construction and in the arrangement of parts without departing from the scope of the invention as set forth in the appended claims.

What is claimed is:—

1. In an apparatus of the class described, the combination of a wheeled frame, mutually connected plow beams having their forward ends pivotally connected to the frame, a bail rotatably mounted on said beam and having its arms projecting forwardly, a sleeve pivoted on the frame in which one of the arms of the bail is slidably engaged, a lever pivoted on the frame, a sleeve pivoted to said lever and in which the other end of the bail is slidably engaged, and means for securing the lever in a desired adjusted position.

2. In an apparatus of the class described, the combination of a wheeled frame, a plow beam pivotally connected to the frame, a shaft rotatably mounted on the frame, crank arms on respective ends of said shaft, a sleeve pivoted to the free end of one of said crank arms, a bracket mounted on the beam, a rod pivoted to the bracket and slidably engaged in said sleeve, a spring encircling said rod and bearing at one end against the bracket and at its other end against the sleeve, a sleeve pivoted on the free end of the other crank arm, a lever pivoted on the frame, a rod pivoted to the lever and slidably engaged in the second sleeve, a stop on said rod, a spring encircling the rod and bearing at one end against the stop and at its other end against the second named sleeve, and means for securing the lever in a desired adjustment.

In testimony whereof, I affix my signature in the presence of two witnesses.

WILLIAM I. KENISON.

Witnesses:
J. C. BAILEY,
J. J. LITTLE.